United States Patent [19]

Yabuki et al.

[11] Patent Number: 4,888,153

[45] Date of Patent: Dec. 19, 1989

[54] FE-BASE BUILD-UP ALLOY EXCELLENT IN RESISTANCE TO CORROSION AND WEAR

[75] Inventors: Ritsue Yabuki; Saburo Wakita, both of Omiya, Japan

[73] Assignee: Mitsubishi Kinzoku Kabushiki Kaisha, Tokyo, Japan

[21] Appl. No.: 219,694

[22] Filed: Jul. 7, 1988

[30] Foreign Application Priority Data

Jul. 16, 1987 [JP] Japan .................... 62-175912

[51] Int. Cl.$^4$ .................. C22C 38/58; C22C 38/38
[52] U.S. Cl. ................... 420/57; 420/59; 420/68; 420/66; 420/583; 420/586
[58] Field of Search .......... 420/46, 47, 57, 59, 420/68, 583, 584, 586.1

[56] References Cited

U.S. PATENT DOCUMENTS

| | | | |
|---|---|---|---|
| 3,861,907 | 1/1975 | Dulis et al. | 420/59 |
| 4,086,085 | 4/1978 | McGurty | 420/46 |
| 4,430,297 | 2/1984 | Crook | 420/586.1 |

FOREIGN PATENT DOCUMENTS 57-16145 1/1982 Japan .................... 420/583

*Primary Examiner*—Deborah Yee
*Attorney, Agent, or Firm*—Armstrong, Nikaido Marmelstein, Kubovcik & Murray

[57] ABSTRACT

An Fe-base build-up alloy excellent in resistance to corrosion and wear is disclosed. This alloy comprises in weight percent:
C: from 0.005 to 1.6%,
Mn: from 4 to 28%,
Cr: from 12 to 36%,
Mo: from 0.01 to 9%,
Hf: from 0.005 to 15%,
N: from 0.01 to 0.9%, and optionally contained:
Si: from 0 to 5%,
Ni: from 0 to 30%, and one or both of:
Nb and W: from 0 to 6%, and the balance being Fe and incidental impurities.

3 Claims, No Drawings

FE-BASE BUILD-UP ALLOY EXCELLENT IN RESISTANCE TO CORROSION AND WEAR

BACKGROUND OF THE INVENTION

1. Field of the Invention

The present invention relates to an Fe-base build-up alloy excellent in resistance to corrosion and wear, which permits, when applying surface hardening build-up welding by TIG or PTA to a friction part such as a valve or a valve seat used in a chemical plant, particularly in a nuclear power plant, formation of weld beads having a very high hardness and excellent in resistance to corrosion as well as to wear in high-temperature and high-pressure water.

2. Prior Art

A Co-base alloy (Co-28Cr-4W) is employed for surface hardening build-up of valves and valve seats used in chemical and nuclear power plants for its excellent resistance to wear and corrosion.

However, because accumulation of radioactive corrosion products in various chemical plants, particularly in nuclear power plants leads to an increased quantity of radiation, the necessity of reducing $Co^{60}$ is recognized to inhibit it, and there is an increasing demand for using Co-free Ni or Fe-base alloys from the point of view of improving safety. While various alloys have been proposed, there is available at present no alloy provided with all the necessary properties such as corrosion resistance and wear resistance. It is therefore still inevitable to use the Co-base alloy involving safety problems.

SUMMARY OF THE INVENTION

From the aforementioned point of view the present inventors carried out studies with a view to developing a material suitable for surface hardening build-up of a friction part such as a valve or a valve seat used in a nuclear power plant or the like, and found as a result that an Fe-base alloy containing in weight percent:

C: from 0.005 to 1.6%,
Mn: from 4 to 28%,
Cr: from 12 to 36%,
Mo: from 0.01 to 9%,
Hf: from 0.005 to 15%, and
N: from 0.01 to 0.9%, and containing, depending on the results desired:

Si: from 0 to 5% and
Ni: from 0 to 30% or
Si: from 0.01 to 5%, and
Ni: from 5 to 30%, and further additionally containing, depending on the results desired one or both of:

Nb: from 0 to 6% and
W: from 0 to 6% or
Nb: from 0.01 to 6%, and
W: from 0.01 to 6%, and the balance being Fe and incidental impurities has a Vickers hardness of over 420 at the ambient temperature, is excellent in corrosion resistance and intermetallic wear resistance in hot water at 300° C., applicable for build-up welding and casting, and would therefore display its full merits for a very long period of time when employed in valves or valve seats used in a severe environment involving corrosion and wear as in a nuclear power plant or a chemical plant.

DETAILED DESCRIPTION OF THE INVENTION

The present invention is based on the above-mentioned finding. The reasons of limiting the chemical composition as above are described below.

(a) C

The C component has effects of improving strength through dissolution into the matrix, improving hardness (wear resistance) through formation of $M_7C_3$, MC and $M_{23}C_6$ type carbides by the combination with such alloy elements as Cr, W, Nb, Hf and Mo, and furthermore improving weldability and castability. However, with a carbon content of under 0.005%, desired effects as described above cannot be achieved. A carbon content of over 1.6%, on the other hand, not only causes precipitation of more carbides, but also leads to larger particles sizes of carbides, resulting in a lower toughness. The C content should therefore be within the range of from 0.005 to 1.6%.

(b) Mn

The Mn component has an effect of stabilizing austenite through dissolution into the matrix and deoxidizing and desulfurizing effects, and particularly has an effect of improving wear resistance (hardness) and corrosion resistance. With an Mn content of under 4%, however, desired effects as described above are not available. An Mn content of over 28%, on the other hand, not only brings about no further improvement in the effects as described above, but also makes it difficult to accomplish melting and casting of alloy. The Mn content should therefore be within the range of from 4 to 28%.

(c) Cr

The Cr component has effects of particularly improving hardness through dissolution of part thereof into the matrix and formation of carbides from the remaining part, thereby improving wear resistance, and in addition, of improving corrosion resistance in hog water. If the Cr content is under 12%, however, desired effects as described above cannot be obtained. With a Cr content of over 36%, on the other hand, toughness tends to decrease. The Cr content should therefore be within the range of from 12 to 36%.

(d) Mo

The Mo component has an effect of improving hardness (wear resistance) and strength through dissolution into the matrix. However, an Mo content of under 0.01% cannot give a desired effect as described above, and an Mo content of over 9% causes decrease in toughness as in the case of the W component, thus resulting in a lower impact resistance. The Mo content should therefore be within the range of from 0.01 to 9%.

(e) Hf

The Hf component has effects of improving corrosion resistance through dissolution into austenitic matrix formed mainly by the Fe, Ni and Cr components, and improving hardness through formation of MC-type carbides by the combination with C. However, an Hf content of under 0.005% cannot give desired effects as described above, and an Hf content of over 15% brings about no further improving effects and is economically disadvantageous. The Hf content should therefore be within the range of from 0.005 to 15%.

(f) N

The N component has effects of improving strength through partial dissolution into austenitic matrix and stabilization thereof, and in parallel with this, forming metal nitrides. In the presence of Hf, the N component has an effect of preventing decrease in toughness and thus improving impact resistance through inhibition of production of these precipitates. However, an N content of under 0.01% cannot give desired effects as described above. With an N content of over 0.9%, on the other hand, the quantity of precipitated nitrides increases with coarser grains, thus leading to a more brittle structure and a lower toughness. The N content should therefore be within the range of from 0.01 to 0.9%.

The Fe build-up alloy of the invention may also contain, depending on the effect desired the following additional elements:

(g) Si

Silicon is present in amounts of 0 to 5.0%. When Si is present the content desired is usually at least 0.01% in order to ensure desired deoxidizing effect, castability, build-up weldability, and molten metal fluidity. An Si content of over 5.0% cannot give, on the other hand, a further improving effect. The Si content should therefore be within the range of from 0.01 to 5.0%.

The alloy may contain Si in an amount within the range of under 0.01% as one of incidental impurities when Si is used as a deoxidizer to utilize its deoxidizing effect as described above. In this case, Si may be contained so as to reach a total content of over 0.01% including the content as one of the incidental impurities.

(h) Ni

Nickel is present in amounts of 0 to 30%. The Ni component has effects of improving toughness through stabilization of austenitic matrix, and in the presence of Cr, of improving corrosion resistance. When Ni is present the content desired is usually from 5 to 30%. A Ni content of over 30% cannot give further improving effects. Considering economic advantages, the Ni content should be within the range of 5 to 30%.

(i) Nb

Niobium is present in amounts of 0 to 6%.

The Nb component has effects of largely inhibiting grain growth of the matrix, rather refining crystal grains, and forming MC-type carbides and nitrides, thus further improving hardness. However, an Nb content of under 0.01% may not give desired effects as described above, and an Nb content of over 6% accelerates formation of carbides and leads to a lower toughness. The Nb content should therefore be within the range of from 0.01 to 6%.

(j) W

Tungsten is present in amounts of 0 to 6%.

The W component has effects of dissolving into the matrix to strengthen it and further improving hardness through formation of carbides. When W is present the content desired is usually 0.01 to 6%. A W content of over 6% results in a decreased toughness. The W content should generally be within the range of from 0.01 to 6%.

Zr may be contained as one of incidental impurities. As a Zr content of over 0.6% impairs toughness, castability and weldability, the Zr content should not be over 0.6%.

EXAMPLE

Now, the Fe-base surface hardening build-up alloy of the present invention is described in detail with reference to an example.

TABLE 1

| Kind of alloy | Chemical composition of alloy (wt. %) | | | | | | | | | | | |
|---|---|---|---|---|---|---|---|---|---|---|---|---|
| | C | Mn | Cr | Mo | Hf | N | Si | Ni | Nb | W | B | Fe |
| Conventional Ni-base build-up alloy | 0.83 | — | 10.30 | — | — | — | 5.49 | balance | — | 2.00 | 0.53 | 2.69 |
| Fe-base build-up alloy of the present invention 1 | 0.011 | 9.04 | 35.01 | 1.04 | 3.11 | 0.15 | — | — | — | — | — | balance |
| 2 | 1.51 | 5.07 | 13.48 | 7.97 | 1.49 | 0.06 | — | — | — | — | — | balance |
| 3 | 0.54 | 4.86 | 28.06 | 3.11 | 7.04 | 0.24 | — | — | — | — | — | balance |
| 4 | 1.19 | 18.14 | 20.03 | 5.48 | 4.70 | 0.11 | — | — | — | — | — | balance |
| 5 | 0.72 | 26.07 | 22.01 | 6.10 | 0.009 | 0.31 | — | — | — | — | — | balance |
| 6 | 0.16 | 21.04 | 18.46 | 0.07 | 14.03 | 0.48 | — | — | — | — | — | balance |
| 7 | 0.88 | 12.09 | 26.01 | 0.38 | 10.16 | 0.79 | 4.67 | 28.08 | — | — | — | balance |
| 8 | 0.90 | 5.53 | 21.97 | 3.16 | 1.54 | 0.16 | — | — | 3.96 | — | — | balance |
| 9 | 0.87 | 18.10 | 22.06 | 5.09 | 1.60 | 0.23 | — | — | — | 0.16 | — | balance |
| 10 | 0.93 | 11.97 | 22.09 | 2.04 | 1.07 | 0.18 | — | — | 0.09 | 5.42 | — | balance |
| 11 | 0.86 | 5.61 | 21.98 | 1.02 | 3.06 | 0.10 | 0.08 | 15.07 | 5.02 | — | — | balance |
| 12 | 0.90 | 9.18 | 21.99 | 2.17 | 5.92 | 0.25 | 0.96 | 8.10 | — | 3.01 | — | balance |
| 13 | 0.91 | 5.70 | 22.10 | 3.20 | 3.86 | 0.22 | 2.54 | 22.12 | 1.51 | 2.07 | — | balance |

Fe-base build-up alloys of the present invention Nos. 1 to 13 and comparative Fe-base build-up alloys Nos. 1 to 6 having respective chemical compositions as shown in Table 1, and a conventional alloy having a chemical composition corresponding to that of the conventional Ni-base alloy were prepared by the conventional melting method, and welding rods having a diameter of 4.8 mm were formed through vacuum-suction casting under conventional condictions.

In all the comparative Fe-base alloys Nos. 1 to 6, the content of any of the component elements (marked * in Table 2) is outside the specified range of the present invention.

Subsequently, using the welding rods of the resulting Fe-base build-up alloys of the present invention Nos. 1 to 13, comparative Fe-base alloys Nos. 1 to 6 and conventional build-up alloy, sheet-shaped weld beads having a length of 100 mm, a width of 20 mm and a thickness of 5 mm were formed into three layers by a TIG automatic welding machine on the surface of base metals made of stainless steel having a length of 120 mm, a width of 50 mm and a thickness of 20 mm.

On the thus formed weld beads, Vickers hardness at the ambient temperature was measured under a load of 20 kg with a Vickers hardness meter.

As is clear from the results shown in Table 3, the Fe-base build-up alloys of the present invention Nos. 1 to 13 provide in all cases far higher room-temperature hardness, intermetallic wear resistance, corrosion resistance in hot water and weldability than in the conventional build-up alloy No. 1.

TABLE 2

| Kind of alloy | | Chemical composition (wt. %) | | | | | | | | | | |
|---|---|---|---|---|---|---|---|---|---|---|---|---|
| | | C | Mn | Cr | Mo | Hf | N | Si | Ni | Nb | W | Be | Fe |
| Comparative Fe-base alloy | 1 | —* | 8.96 | 34.82 | 1.16 | 3.08 | 0.16 | — | — | — | — | — | balance |
| | 2 | 1.50 | 1.53* | 13.61 | 8.02 | 1.51 | 0.05 | — | — | — | — | — | balance |
| | 3 | 0.56 | 5.07 | 8.92 | 3.18 | 7.01 | 0.26 | — | — | — | — | — | balance |
| | 4 | 1.20 | 18.30 | 20.11 | —* | 4.64 | 0.10 | — | — | — | — | — | balance |
| | 5 | 0.69 | 25.94 | 21.96 | 6.14 | —* | 0.28 | — | — | — | — | — | balance |
| | 6 | 0.22 | 20.96 | 18.50 | 0.06 | 14.12 | 1.27* | — | — | — | — | — | balance |

Wear of beads formed in a similar manner was evaluated from specific amounts of water as derived from metal wear tests carried out by means of an Ohkoshi-type metal wear tester under conditions including a counterpart made of SUS (having an $H_RC$ of at least 57), a test temperature equal to the ambient temperature (in dry), a load of 18.2 kg, and a wearing rate of 0.083 (m/sec).

Corrosion test pieces having a length of 25 mm, a width of 10 mm and a thickness of 3 mm were prepared from beads formed in a similar manner, and corrosion resistance was evaluated from corrosion increments in high-temperature corrosion tests carried out in an autoclave under test conditions including pure water and 300° C.×200 hr.

In addition, weldability was tested by cutting a groove having a width of 5 mm, a depth of 1 mm and a length of 100 mm with a radius of curvature of 5R on an SS41 base metal having a thickness of 10 mm, a width of 30 mm and a length of 100 mm, conducting build-up welding in this groove and observing the state of weld: (1) production of a defective build-up; (2) the shape of ripple; and (3) production of wastes. The results were classified into excellent (marked ◎), fair (marked ○) and poor (marked x).

TABLE 3

| Kind of alloy | | Hardness test Vickers hardness at room temp. (HV) | Metal wear test Specific amount of wear × 10$^7$ (mm$^2$/kg) | High-temp. corrosion test Increment by corroding oxidation (mg/cm$^2$) | Weldability test Groove welding (assessed) |
|---|---|---|---|---|---|
| Conventional Ni-base build-up alloy | | 412 | 2.13 | 1.80 | x |
| Fe-base build-up alloy of the present invention | 1 | 426 | 0.61 | 0.67 | ○ |
| | 2 | 451 | 0.67 | 0.74 | ○ |
| | 3 | 466 | 0.59 | 0.61 | ◎ |
| | 4 | 459 | 0.61 | 0.57 | ◎ |
| | 5 | 454 | 0.57 | 0.52 | ○ |
| | 6 | 469 | 0.54 | 0.51 | ○ |
| | 7 | 472 | 0.49 | 0.46 | ○ |
| | 8 | 456 | 0.64 | 0.62 | ○ |
| | 9 | 458 | 0.61 | 0.55 | ◎ |
| | 10 | 465 | 0.56 | 0.53 | ○ |
| | 11 | 469 | 0.51 | 0.52 | ◎ |
| | 12 | 474 | 0.48 | 0.46 | ◎ |
| | 13 | 476 | 0.45 | 0.41 | ◎ |
| Comparative Fe-base alloy | 1 | 417 | 0.72 | 0.66 | x |
| | 2 | 419 | 0.88 | 1.08 | x |
| | 3 | 416 | 0.79 | 1.29 | ○ |
| | 4 | 412 | 0.86 | 0.62 | ○ |
| | 5 | 415 | 0.65 | 0.57 | x |
| | 6 | 492 | 0.31 | 0.53 | x |

Furthermore, these characteristic values perfectly satisfy, leaving sufficient margins, the property requirements for valves and valve seats used in nuclear power plants and chemical plants.

In contrast, in the case of the comparative build-up alloys Nos. 1 to 6 in which the content of any of the component elements is outside the specified range of the present invention, the formed weld beads are defective in one or more of such properties as room-temperature hardness, the specific amount of metal wear at the room temperature, corrosion resistance in hot water, and weldability assessment in groove welding test.

According to the Fe-base build-up alloy of the present invention, as described above, it is possible not only to conduct powder PTA welding, but also to form weld beads which show an excellent weldability, have a high room-temperature hardness, and are excellent in wear resistance as well as in corrosion resistance in hot water. When this alloy is applied in such friction parts as valves and valve seats employed in a nuclear power plant or a chemical plant, it displays its full merits of excellent properties, thus providing industrially useful effects.

The Fe-base build-up alloy of the present invention may be applied also for build-up welding of a part required to have a high wear resistance such as an engine valve, a shaft sleeve, a bearing, an extrusion screw, a backup roll, a pump part or a plunger, and it is needless to mention that, in such a case, the resultant build-up welded part can display an excellent performance.

What is claimed is:

1. An Fe build-up alloy excellent in resistance to corrosion and wear, consisting essentially of in weight percent:
   C: from 0.005 to 1.6%,
   Mn: from 4 to 28%,
   Cr: from 12 to 36%,
   Mo: from 0.01 to 9%,
   Hf: from 0.005 to 15%,
   N: from 0.01 to 0.9%, and
further containing:
   Si: from 0 to 5%,
   Ni: from 0 to 30%, and
one or both of:
   Nb and W: from 0 to 6%, and
the balance being Fe and incidental impurities.

2. The Fe build-up alloy of claim 1 containing 0.01 to 5% Si and 5 to 30% Ni.

3. Fe build-up alloy of claim 1 containing one or both of Nb and W in amounts of from 0.01 to 6%.

* * * * *